(12) United States Patent
Kohavi

(10) Patent No.: US 7,490,353 B2
(45) Date of Patent: Feb. 10, 2009

(54) DATA TRANSFER SECURITY

(75) Inventor: Ron Kohavi, Ramat-HaSharon (IL)

(73) Assignee: Kidaro, Inc., Washington, DC (US)

( * ) Notice: Subject to any disclaimer, the term of this patent is extended or adjusted under 35 U.S.C. 154(b) by 385 days.

(21) Appl. No.: 11/357,947

(22) Filed: Feb. 22, 2006

(65) Prior Publication Data

US 2006/0190606 A1    Aug. 24, 2006

Related U.S. Application Data

(60) Provisional application No. 60/688,692, filed on Jun. 9, 2005, provisional application No. 60/654,465, filed on Feb. 22, 2005.

(51) Int. Cl.
*G06F 11/00* (2006.01)
(52) U.S. Cl. .................... 726/22; 726/27; 713/189; 713/193
(58) Field of Classification Search ................ None
See application file for complete search history.

(56) References Cited

U.S. PATENT DOCUMENTS

| | | | |
|---|---|---|---|
| 5,835,726 A | 11/1998 | Shwed et al. | 395/200.59 |
| 5,978,917 A | 11/1999 | Chi et al. | 713/201 |
| 2006/0031315 A1* | 2/2006 | Fenton et al. | 709/206 |
| 2006/0265761 A1* | 11/2006 | Rochette et al. | 726/27 |

* cited by examiner

*Primary Examiner*—Pramila Parthasarathy
(74) *Attorney, Agent, or Firm*—Woodcock Washburn LLP

(57) ABSTRACT

An apparatus for protecting against computer malware, comprising: a data inputter for intercepting data units flow, a trust level assigner, associated with the data inputter, for assigning to each of the data units a respective trust level, an isolated-processing environment, operable to process the data units in an isolated manner and configured to send copies of the processed data units out of the isolated-processing environment, and a processing environment selector, associated with the trust level assigner and the isolated-processing environment, operable to determine if a data unit is to be executed on the isolated-processing environment, in accordance with the respective trust level.

56 Claims, 9 Drawing Sheets

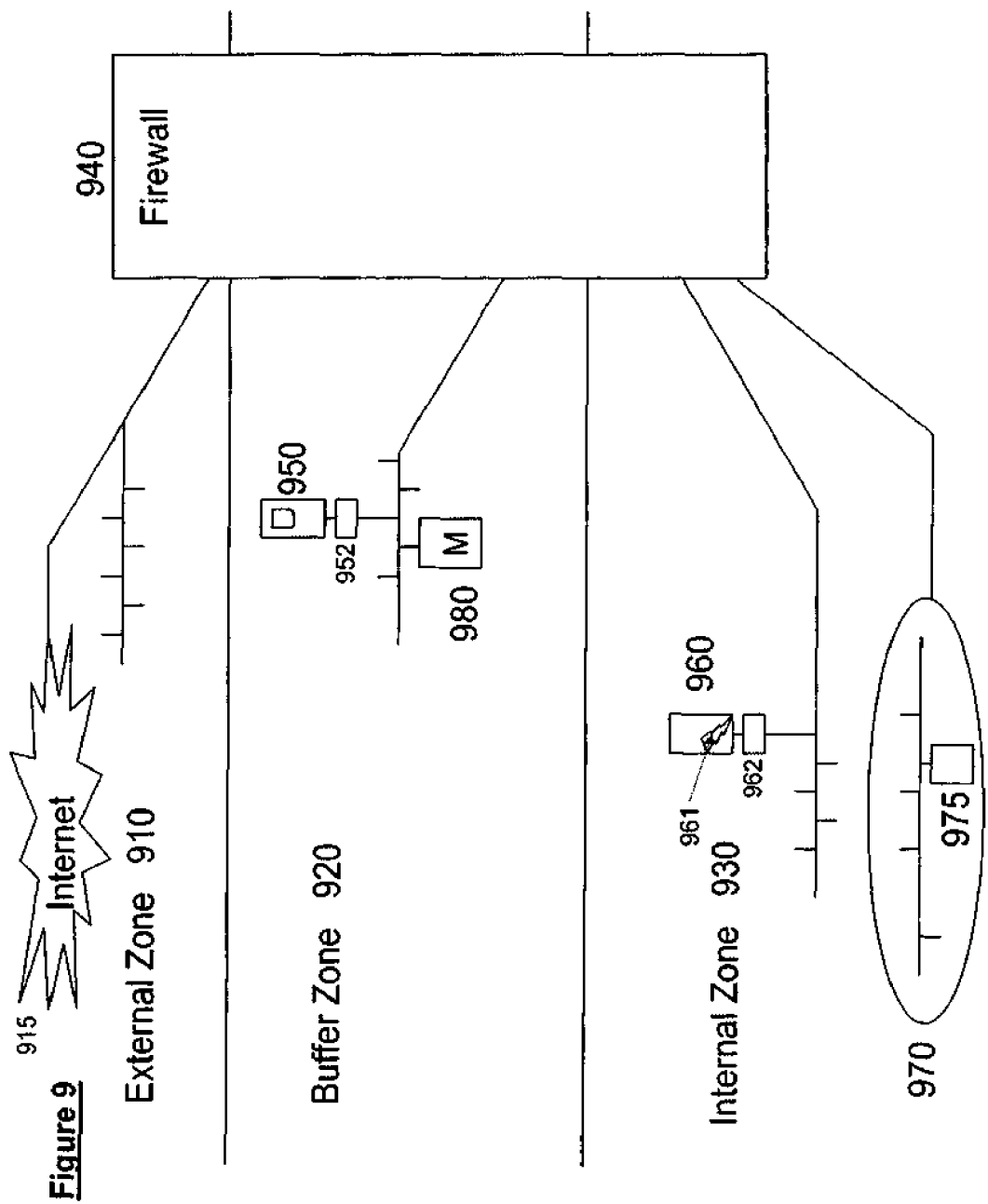

DATA TRANSFER SECURITY

RELATED APPLICATIONS

The present application claims priority from U.S. Provisional Patent Application No. 60/654,465, filed on Feb. 22, 2005, and U.S. Provisional Patent Application No. 60/688,692, filed on Jun. 9, 2005, the contents of which are hereby incorporated by reference.

FIELD AND BACKGROUND OF THE INVENTION

The present invention relates to computer networks and more particularly but not exclusively to the protection of information technology (IT) systems against malicious content.

Modern enterprises are reliant on their IT to perform their day-to-day operations. IT systems are continuously used to communicate with partners, providers, customers and other public and private data networks, such as the Internet. Businesses have grown to be dependent on those communication channels.

Unfortunately, these communication channels have been exploited by Malicious Content (Malware), which has become a common problem for today's enterprises. Malicious Content is classified into several categories: computer viruses—malicious computer programs that replicate themselves, worms—computer programs which quickly spread through a computer network and clog up the network, spyware—deceptive software that installs itself on a computer and allows an outsider to harvest private information, and trojan horses—programs that appear to have some useful or benign purpose but really mask some hidden malicious code.

Such malware directly exploits expensive IT resources and exposes internal confidential information to attackers.

An enterprise internal computer network usually comprises of tens to hundreds of thousands interconnected computers. The internal network is usually connected to an external network (or networks), such as the Internet, to carry communications with peers outside the organization. Most of the internal computers are continuously communicating with peers inside and outside the enterprise at the same time, to perform the day-to-day activities. The enterprise's workers, who use those computers, access different channels to transfer information. For example, workers use email to exchange messages and files with peers inside and outside the organization. The World Wide Web is continuously accessed to harvest information, upload files, and download files. Instant messaging programs are becoming popular as means to promptly share information. Recently, removable media devices such as Disk-on-Key®, by M-Systems Inc. are also becoming very popular. All the above-described channels of information transfer are leading directly into the heart of the enterprise and are exploited by malware.

Malware typically disguises itself as business essential data (email, web pages etc.), in order to penetrate into enterprises and then execute its malicious payload inside the enterprise internal networks. As said, penetration into the organization is done by disguising the malware as normal business data that is often communicated over the different channels. Once malware has penetrated into the organization, two main methods are leveraged to execute the malicious payload. These methods are known in the art as social engineering and exploiting software vulnerabilities.

Social engineering is used to trick the malware receiver into believing that the content is safe, important for the business or to the receiver personally. Various methods are used to achieve this goal, such as faking the source contact information (in case of email, for example, the FROM: field may be faked to be a partner, in Web pages the URL may be faked to be the URL of a known partner), creating an appealing content that will make the receiver execute the malware, and generating confusion (for example by faking a technical error and asking the user to run the malware in order to "correct the error").

Software vulnerabilities are errors in software that allow an attacker to mount an attack on a computer system that is installed with or interacts with the software. Exploiting software vulnerability usually allows the malware creator to execute the malicious content on the target computer system without requiring any authorization from the system owner, user, or administrator. Software vulnerabilities and ways to exploit computer systems using these vulnerabilities are publicly available on security and hacking related posts, newsgroups, and blogs. Malware creators frequently leverage this knowledge in order to allow malware to execute on target computer systems within enterprises.

Several widely popular tools are currently used to fight malware. Three of the most dominant tools known in the art are Firewalls, Anti-virus software and Intrusion detection/prevention systems (IDS/IPS). Most enterprises deploy a combination, or even all of the above mentioned tools. Recent surveys suggest that more than 95% of modern enterprises are using firewalls and anti-virus software, while more than 60% of business enterprises deploy IDS/IPS systems. This emphasizes the significance of the malware problem, faced by enterprises today.

Firewalls provide means to segregate computer networks into separated segments and control the transfer of information between these different segments. Firewalls typically follow a policy that is defined by the enterprise security needs. Such policies usually define what applications (or channels) are allowed to communicate between the different segments and in which direction. For example, a firewall, placed between an internal network and the Internet, may allow only outgoing Web surfing requests. In such a case, if an incoming Web request is encountered at the firewall, it is blocked and all data is discarded.

A popular firewall deployment scheme, illustrated in FIG. 1, includes three zones: an external zone 110, an internal zone 130, and a buffer zone 120. The external zone 110 is connected to all external or public networks (such as the Internet). Internal zone 130 includes all the enterprise computers that need to be filtered from external threats. Buffer zone 120 includes all computers that are serving both internal and external communications, such as mail servers and in some cases Web servers. Firewall 140 is configured with rules to filter data between these three zones.

For example, Shwed et al U.S. Pat. No. 5,835,726, entitled "System for securing the flow of and selectively modifying packets in a computer network" discloses such a firewall system for controlling the inbound and outbound data packet flow in a computer network.

However, Firewalls are become ineffective as malware attacks become similar and indistinguishable from essential business data and are use the same communication channels essential business data is transmitted over. Thus, a firewall policy cannot block communication over such channels without badly affecting on the enterprise operation efficiency.

Anti-viruses aim to detect and remove malicious content threats. Different Anti-virus packages provide different scopes of protection against those threats. Anti-virus software packages are traditionally based on signature banks. These signature banks are created by the Anti-virus software vendors and include unique identifiers for all known malware. Potentially malicious content is scanned for known signatures, or identifiers. When such an identifier is found, a specialized cleaning routine is used to remove the malicious code. Recent anti-virus software packages introduce heuristic-based systems, which utilize a set of inexact procedures, usually in addition to signature banks, in order to fight malware threats that are not included in the signature banks. Some heuristic-based systems dynamically monitor the computer system for abnormal behavior patterns. When such a behavior is detected, the offending process is blocked. Other heuristic-based solutions statically scan for potential malware by looking for known malicious content patterns.

For example, Chi U.S. Pat. No. 5,978,917, entitled "Detection and elimination of macro viruses" teaches a system and method for detecting and eliminating computer viruses of a particular class known as macro viruses. A Macro is a computer program written using a structured programming language and created from within an application program that has a global environment and can create local documents. Normally, a macro can be invoked using a simple command such as a keystroke. The application program can be, for example, Microsoft® Word or Excel. A Macro virus is a virus consisting of one or more macros.

However, malicious content is rapidly becoming similar to business essential data. Over time, in an evolutionary manner, malicious content has adapted the attributes of what is considered to be business essential data. Adopting business essential data attributes allows malware to avoid detection and removal.

An outstanding example can be given lately by malware spreading as email messages. Because email is considered essential to many businesses, most businesses cannot afford to filter out email messages. Malware attacks exploit this fact, and use email as a carrier that is known to enter the enterprise virtual premises relatively easily. Anti-virus solutions have adapted and added the ability to scan email traffic. In order to circumvent those email scanning solutions, some recent malware attacks are spreading using an encrypted email attachment. The password for the encrypted attachment is provided in the email as an image. This creative method allows malware to avoid scanning (because of encryption) while making it extremely difficult for the anti-virus solutions to decrypt the attachment (because recovering the password requires parsing the image, which is a complex and resource demanding activity). The only solution anti-viruses are left with is globally blocking any email messages with an image and an encrypted attachment. This solution clearly blocks non malicious email messages, and thus hurts business essential data flow.

Intrusion Detection and Prevention (IDS/IPS) tools, for example, the McAfee Inc. IntroShield™ line of products, are designed to detect an attack on the organization and prevent it. These tools usually act in real-time (or near real-time). There are two major types of IDS/IPS tools: host based and network based. Host based tools include an agent software that is installed on some of the enterprise hosts, and measures activities such as networking activities and operating system parameters. Network based tools reside at the network level and measure activities that are visible at the network level. Generally, IDS/IPS tools use signature based methods, similar to Anti-viruses, to detect known attack signatures in the measured activities. Some of the IDS/IPS tools incorporate heuristic based approaches to find suspicious activities. Prevention is provided by cutting off communications that are identified to be malicious by a known attack signature, or by a heuristic rule.

As described above, due to malware attacks that cannot be distinguished from essential business data, both signature based IDS/IPS solutions and heuristic based IDS/IPS tools hurt enterprises, as the enterprises cannot freely communicate over their essential communication channels.

New tools which take a role in the fight against malware are patches and patch management systems. Patches are software fixes, usually issued by software vendors to fix detected problems. As far as fighting malware is concerned, patches are used to fix known software vulnerabilities. Once a patch is applied, the software should be immune to the vulnerabilities that the patch solves. Patch management systems are commonly used in enterprises to manage the process of applying software patches to various computer systems. Patch management systems are usually accompanied by enforcement tools that prevent network access from endpoints which are not updated with the latest patch.

Patches and patch management systems are used to fix software vulnerability problems. These patches are always issued after the software vulnerabilities exist and usually after these vulnerabilities are widely spread. A standard software vulnerability lifecycle is illustrated in FIG. 2. This problem follows the following stages: a) the vulnerability is created together with the software or software version 210, b) the vulnerability becomes applicable as soon as the software/version is installed 220, c) the vulnerability is detected and usually publicized 230, d) a patch is developed 240, and e) the patch is applied 250.

It is apparent that the computer system affected by the problem is vulnerable from stage b to stage e. As soon as the vulnerability is detected and publicized (stage c), it draws attention from the public and potential attackers. This increases the potential of an attack exploiting the detected vulnerability, but leaves no remedy to affected computer systems users and administrators. At stage d, when a patch is available, the computer systems users and administrators are thrown into a "patching race". A patch becomes available and users/administrators rush to apply it. Applying a patch in an enterprise environment is a complex and costly task. It requires lengthy testing and a massive, unplanned, change across a large set of the computer systems installed within the enterprise. Patch management systems allow automation of many related repetitive tasks, but cannot decrease the frequency of patch updates without compromising the security of vulnerable systems.

Thus, two problems arise from patches and patch management: first, enterprises are at risk as soon as they install software that includes a vulnerability problem. The risk potential rises dramatically when the vulnerability is detected and publicized. Second, enterprises are thrown into the "patching race", rushing to apply each and every relevant patch as soon it becomes available. This activity is massively time and resource demanding.

The above described traditional methods and tools for fighting malware have become inefficient, as widely available statistics clearly state: more than 70% of companies report intrusions during 2002, 2003 and first half of 2004, despite the widespread deployment of the above mentioned methods and tools.

The failure of traditional tools to successfully combat the growing threats posed by malicious software has recently given its part, together with other factors, in pushing many enterprises into re-designing their IT infrastructures into centralized architectures, which essentially call for data centers to be established, in an effort to gain more control and security.

Actually, this recent trend introduces a main frame like architecture, built on top of open systems platforms, using desktop computers installed with "thin layer" clients that no longer run the applications but are only used for interacting users, and strong central servers.

Many vendors, for example, Citrix System Inc, are now offering solutions for implementing such architectures. Other vendors, like X-pert Integrated Systems Inc. offer security systems that are tailored solutions for such architectures.

However, the existing security tools, offered for such architectures, are still reliant on the failing old tools, namely, Firewalls, Anti-viruses, and IPS/IDS systems. Furthermore, many enterprises find a centralized computing architecture much less fitting than a distributed architecture.

The threat posed by the malware problem grows with the improvement in communication capabilities, as a constant decrease in the time it takes for a malware attack to propagate becomes apparent. The time to propagate has decreased from months to hours over the course of the last few years. Current malware attacks propagate to millions of computer systems in just a few hours. Researchers suggest that propagation times will decrease to minutes or even seconds in the next years. As a result, traditional tools and methods for fighting malware become even less affective as not enough time is left, to update signature banks, prepare software patches, or even update heuristic rules.

In addition, recent regulatory compliance standards acknowledge the external malicious risks to internal resources and confidential information and enforce companies to take measures to isolate external threats and remove any potential influences on internal resources.

There is thus a widely recognized need for, and it would be highly advantageous to have a system and method for protecting IT systems against malicious content, which is devoid of the above limitations.

SUMMARY OF THE INVENTION

According to one aspect of the present invention there is provided an apparatus for protecting against computer malicious software, comprising: a data inputter for intercepting data units flow, a trust level assigner, associated with the data inputter, for assigning to each of the data units a respective trust level, an isolated-processing environment, operable to process the data units in an isolated manner and configured to send copies of the processed data units out of the isolated-processing environment, and a processing environment selector, associated with the trust level assigner and the isolated-processing environment, operable to determine if a data unit is to be executed on the isolated-processing environment, in accordance with the respective trust level.

According to a second aspect of the present invention there is provided a system for protecting against computer malware, components comprising: a data inputter for intercepting data units flow, a trust level assigner, associated with the data inputter, for assigning each of the data units a respective trust level, an isolated-processing environment, operable to process the data units in an isolated manner and configured to send copies of the processed data units out of the isolated-processing environment, at least one end-point system for processing the data units, in a non-isolated manner, at least one end-point agent, each residing on a respective end-point system, and associated with the isolated processing environment, and operable to provide the isolated-processing environment with information for controlling the processing of the data units on the isolated-processing environment; and a processing environment selector, associated with the trust level assigner, with the isolated-processing environment, and with the end-point system, and operable to select between the isolated-processing environment and the end-point system for data unit execution, in accordance with the respective trust level.

According to a third aspect of the present invention there is provided a method for protecting against computer malware, comprising: receiving transferred data units, analyzing the data units, assigning to each of the data units a respective trust level, determining for each of the data units if it should be executed in an isolated manner, in accordance with the assigned respective trust level, processing data units, determined to be executed in an isolated manner on an isolated-processing environment on the isolated processing environment, and sending copies of the processed data units out of the isolated processing environment.

According to a fourth aspect of the present invention there is provided a method for protecting against computer malware, comprising: converting a data unit into an unexecutable format, sending the data unit to an end-point system, enabling a user on the end-point system to assign the data unit a respective trust level, and enabling the user on the end-point system to trigger conversion of the data unit into an executable format, according to the trust level.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 9 illustrates an exemplary implementation of system for protection against malware, in an enterprise, according to a preferred embodiment of the present invention.

DESCRIPTION OF THE PREFERRED EMBODIMENTS

Figure 1:
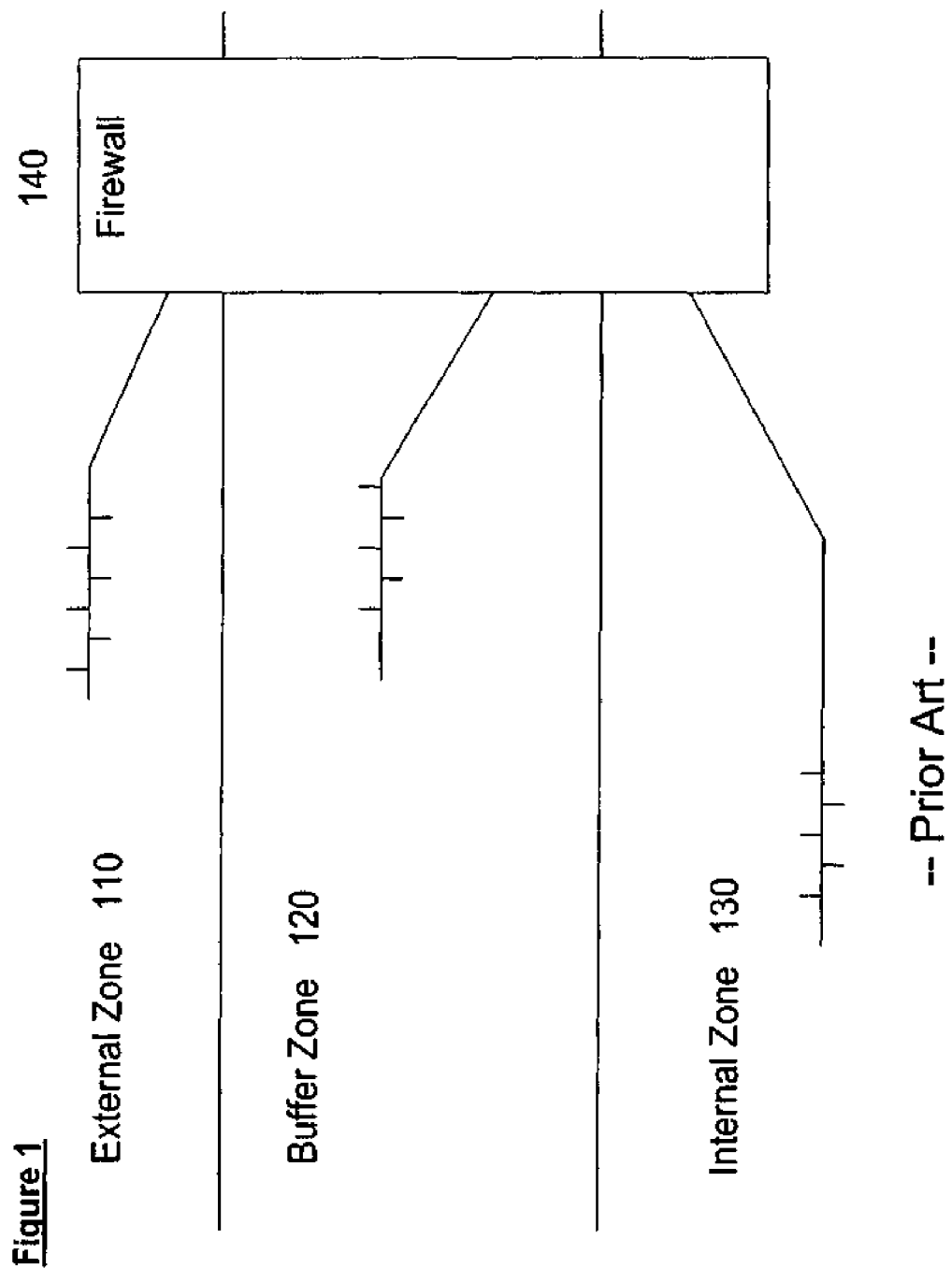
FIG. 1 schematically illustrates a popular firewall deployment scheme, according to the prior art.
Figure 2:
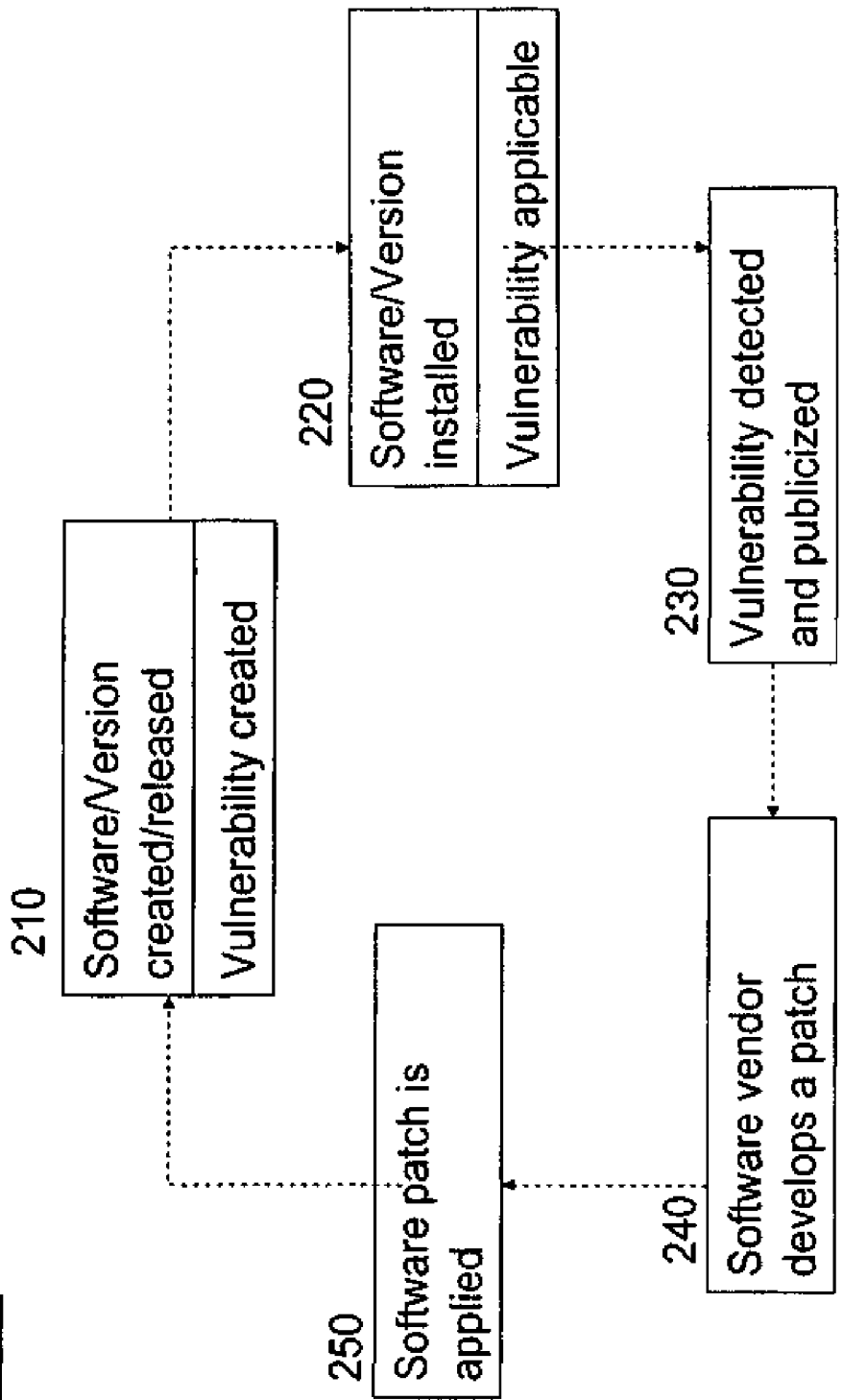
FIG. 2 shows a typical lifecycle of a software vulnerability.

The present embodiments comprise a method and system to protect enterprises from malware attacks. The present embodiments enforce a separation between content (executable or data) from different sources based on the levels of trust assigned for each source. The embodiments then allow safe processing and usage of the content in an isolated manner, according to the assigned trust level.

The principles and operation of a method and system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 3:
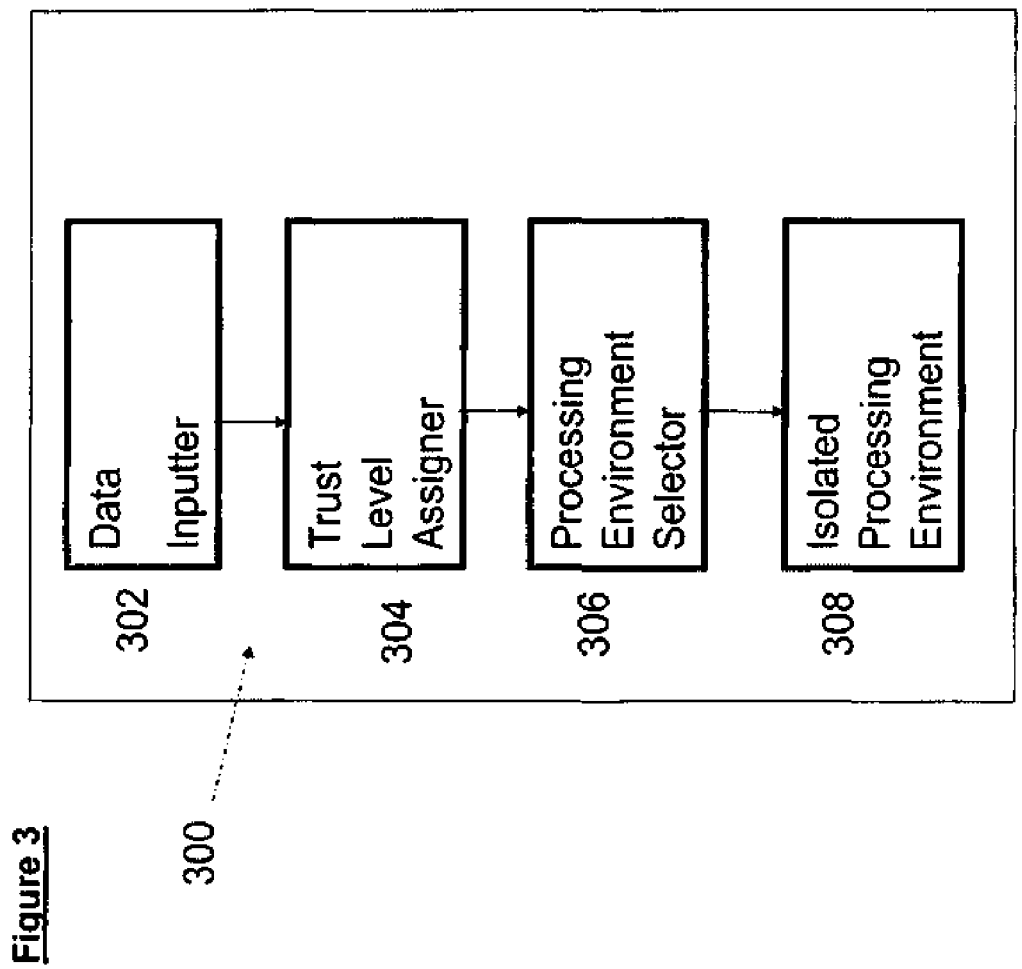
FIG. 3 is a simplified block diagram of an apparatus or protection against malware according to a preferred embodiment of the present invention.

Reference is now made to FIG. 3 which is a simplified block diagram of an apparatus for protection against malware according to a preferred embodiment of the present invention. The schematically illustrated apparatus 300 typically comprises a data inputter 302, a trust level assigner 304, a processing environment selector 306, and an isolated processing environment 308. The data inputter 302 intercepts flowing data units, for example, an email message or a transferred file, and feeds the trust level assigner 304 with data units. The trust level assigner 304 assigns each input data unit a respective trust level, and forwards the data unit to the processing environment selector 306. The processing environment selector 306 determines if the data unit should be executed in an isolated processing environment, according to the trust level assigned to the data unit, and optionally sends the data unit to the isolated processing environment 308, where the data unit is executed in an isolated manner. Otherwise, the data unit is executed in an end-point system.

Preferably, the isolated processing environment sends a copy of the processed data unit out of the isolated processing environment. More preferably, the data unit is not stored on the isolated processing environment any longer than the data unit's processing time.

Figure 4:
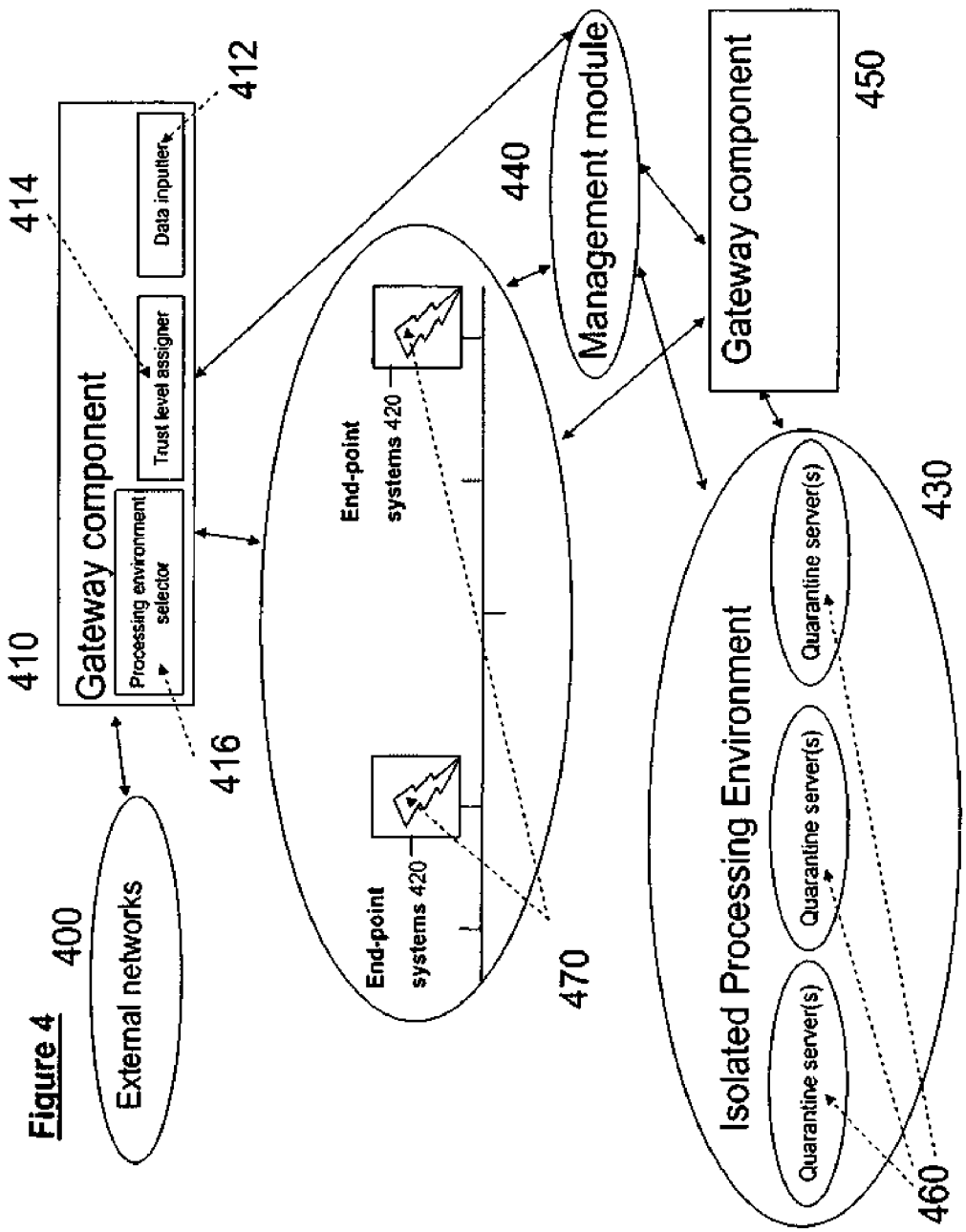
FIG. 4 is a schematic diagram of a system for protection against malware according to a preferred embodiment of the present invention.

FIG. 4 illustrates a system, hereafter referenced as "system 4", for protection against malware, according to preferred embodiment of the present invention.

In system 4, a gateway component 410 may be deployed at the network point where external networks 400 are connected to one or more internal end-point systems 420, such that all transferred data from and into the premises of the implementers of the illustrated system 4, is listened to and optionally processed by the gateway components. The gateway component 410 may be installed on a separated physical computer, on a firewall or on the internal end-point systems 420. In a preferred embodiment of the present invention, each gateway component is installed with a data inputter 412 for intercepting data units, a trust level assigner 414 for assigning each data unit a respective trust level, and a processing environment selector 416 for determining if the data unit is to be processed on an end-point system or on the isolated processing environment 430.

Another gateway component 450 may be installed between the internal end-point systems 420 and an isolated-processing environment 430. This gateway component 450 may also be installed on the same physical machine as the internal end-point system 420 or on any of the quarantine servers 460. The isolated processing environment 430 may include one or more quarantine servers 460.

In a preferred embodiment of the present invention, the gateway 410 is further installed with a data modifier for modifying data units, so as to convert the data units into a non-executable format. This conversion may use an encryption/decryption algorithm, such as DES.

In a preferred embodiment of the present invention, the process of selecting a processing environment is implemented at an end-point agent, a quarantine server, a gateway, any other component of the network, used by the enterprise, such as an external appliance.

Optionally, the quarantine servers in the isolated processing environment 430 are divided into groups 460 of one or more servers. These groups may be separated from each other by any separation mechanism known in the art such as a physical network separation, firewalls, VLANs or any other mechanism.

One or more end-point agents 470 reside on end-point computer systems 420. The end-point systems 420 are used to process the data units in a non-isolated manner.

In a preferred embodiment of the present invention, the data unit is processed on an end-point computer system, or on any quarantine server in the isolated processing environment 430.

Once the processing environment for the data unit has been determined, any modification carried out on the gateway 410 is reversed, and the content is placed for usage on the selected processing environment in an executable form. Reversing the modification may be implemented at the end-point agent 470, the quarantine server 460, gateway 410/450, any other component such as an external appliance or any combination of these.

The isolated processing environment 430 comprises one or more quarantine servers that have been configured to serve end-point agent requests. Part of this configuration preferably includes a dedicated component installed on each quarantine server 460. This component controls and manages the malware protection process described below.

A single quarantine server can serve one or more end-point agents concurrently or sequentially.

Each quarantine server is implemented as a physical entity or as a logical entity.

An example of a physical entity quarantine server implementation is a standard server that is configured as described. An example of a logical entity is a virtualized computing environment, such as Microsoft Inc.® Virtual PC or VMWare Inc.® VMWare workstation, where the logical entity is confined to an isolated space on a non-isolated computer system.

In a preferred embodiment of the present invention, the processing environment selector 416 selects a quarantine server to serve as a processing environment while taking into consideration a complex set of rules, policies, or heuristics. The selection is preferably done by considering various parameters. One parameter which is always taken into consideration is the trust level assigned by a trust level assigner. The trust level assigner, as described above, is implemented on any of the components in system 4. Other possible parameters include the required resources availability, transformation details, metadata, and load.

Once the data unit is placed on a quarantine server 460, in the isolated processing environment 430, in a form that is ready to be used, the data unit is executed. It is possible that the content is not an executable file, but rather a data file that requires a program in order be processed. In these situations, execution refers to the program which executes the data unit serving as its input.

The isolated processing environment 430 then communicates with the relevant end-point agent 470. Communication may be direct or indirect. For example, the isolated processing environment 430 may communicate with the end-point agent 470 through a firewall, or any other device that ensures only authorized traffic is transmitted. Various means are known in the art to isolate the isolated processing environment 430 from any other group of computer systems, and control the communication channels that are allowed between the isolated processing environment 430 and the end-point agent or agents 470. Such isolation decreases dramatically the possibilities of an attack propagating from the quarantine servers 460 to any other servers.

As the execution of the data unit on the isolated processing environment 430 starts, the isolated processing environment 430 establishes a communication channel with the relevant end-point agent 470. The main purpose of these communications is to allow the user of the end-point system installed with the end-point agent 470 to remotely operate the content executed on the quarantine server 460 and to transmit from the isolated processing environment 430 the end-point agent 470 all data required to execute the data unit again with minimal, or no state loss. As an example, keyboard and mouse input may be transferred from the end-point agent 470 to the quarantine server 460.

The end-point agent 470 may visually mark any parts, or windows, of the screen that originated from the isolated processing environment 430. The end-point agent 470 may communicate with the isolated processing environment 430 to support transferring additional data such as drag and drop and clipboard operations (for example: copy, paste, cut) between the end-point system and the isolated processing environment 430. This additional data may be filtered according to a predetermined policy by the end-point agent 470. For example, the end-point agent 470 may be configured to reject any requests to paste clipboard data that originate from a quarantine server 460 in the end-point system. The isolated processing environment 430 may provide continuous output stream, streams, or files that are a result of the data unit processing on the quarantine server 460. For example, full or partial screen images and updates, sound streams, newly created files, updates to existing files, configuration updates may be provided. The end-point agent 470 may receive the output provided by the isolated processing environment 430 and selectively process it. For example, screen updates may be displayed by the end-point system 420 after being modified to fit the screen of the end-point system 420, streamed sound can be played by the end-point system 420, files can be stored on the end-point system 420 etc.

The quarantine servers 460 in the isolated processing environment 430, in a preferred embodiment of the present invention never store any data units or content permanently. These quarantine servers 460 only store data that is required for immediate processing of the data units.

In a preferred embodiment of the present invention, all data required to execute the data unit again with minimal or no state loss is transmitted back from the quarantine server 460 to the end-point system 420. This data is preferably stored persistently by a different component and allowed additional processing at a later stage.

Consequently, the quarantine servers 460 can be reinstalled at any point in time while losing only the state of the currently executed content. Reinstalling the quarantine servers 460 may be done automatically, by following a policy, rules, or heuristics or by receiving a command from a management module 440, as described below, or by any other component.

There are many ways known in the art to efficiently reinstall a system, or revert it to a known previous state, for example, by overwriting the system volatile memories with different images, or by reverting a virtual machine disk to a saved snapshot, or by using a system that diverts all changes to the system volatile memories to other memory banks, and resetting those banks when a reinstall is needed.

Due to the communication channel opened between the isolated processing environment 430 and an end-point agent 470, in the present preferred embodiment the end-point system 420 may become a point where data from different sources is intermixed. Therefore, a gateway component 450 may be placed on the communication channel between the isolated processing environment 430 and the end-point agent 470.

A gateway component may also be implemented at the end-point agent 470, the quarantine server 460, or any other component such as an external appliance or any combination of those. Another type of gateway may be used to slightly change the data presented data in a random fashion, to protect against a deterministic attack pattern.

Additional applications and application specific add-ons or plug-ins, as they are known in the art, may also be installed on the isolated processing environment 430, end-point systems 420 or any other system that interacts with system 4.

Those applications and application specific add-ons or plug-ins may be bundled with the described system components or not. Such applications and application specific add-ons or plug-ins may be used to further manage the quarantine servers 460, assist maintenance, and facilitate management of the described system. For example, these applications may transmit additional files and data between the system components or any other system as necessary.

Applications specific add-ons or plug-ins can be used to further integrate system 4 with existing applications. Such integration can further allow users to seamlessly use the same end-point system to process content with different trust levels while maintaining the look-and-feel of locally executing all data units under the same application, while maintaining the security of the end-point system.

In system 4, a management module 440 is preferably also introduced to control the system, allowing maintenance, configuration, or any other actions that may be required with the present system or any external system in communication with the present system.

The management module 440 communicates with one or more of: gateway components 410/450, end-point agents 470, quarantine servers 460 or any other component that is required. The management module 440 is used to centrally configure, monitor, and maintain the present system. Alternatively, it is possible that management modules are deployed on components of the system separately, or any combination of the above mentioned approaches.

In a preferred embodiment of the present invention, the apparatus system further comprises a display unification agent, residing on the end-point system 420, and configured for creating replica windows for at least one display window originating from the isolated-processing environment 430. Preferably, the replica windows are marked using a differentiating visual effect, such as a red border around each replica-window.

Figure 5:
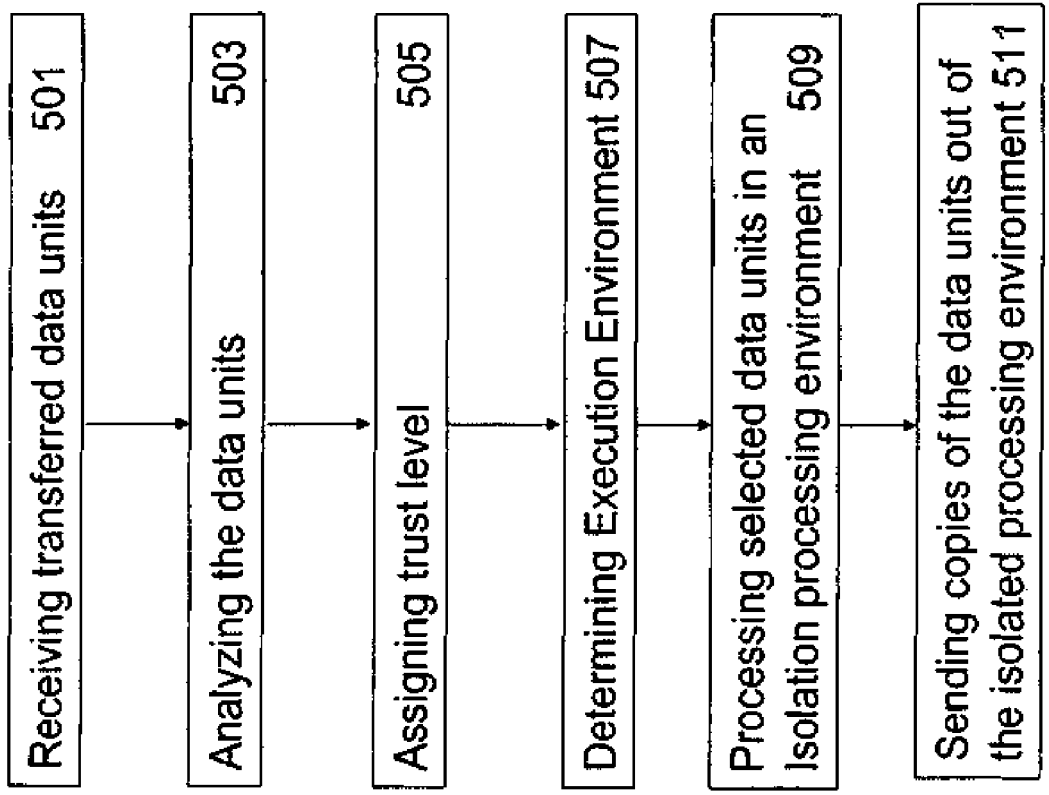
FIG. 5 is a simplified flowchart of a method for protecting against malware according to a first preferred embodiment of the present invention.

FIG. 5 is a simplified flowchart of a possible method for protecting against malware according to a first preferred embodiment of the present invention.

This method comprises: receiving transferred data units 501, analyzing the data units 503, assigning each data unit a trust level 505, according to the analysis of the data units performed in step 503, determining the processing environment 507 (i.e. an end-point computer or an isolated processing environment) according to the trust level assigned to each data unit, processing data units selected to be processed in an isolated manner on an isolated processing environment 509, and sending 511 copies of the processed data units out of the isolated processing environment.

Assigning the trust level to a data unit 505 and determining if it should be processed in an isolated manner 507, may involve following a complex set of rules, policies, or heuristics. These processes preferably further involve parameters such as the actual content of the data unit, its metadata, analysis results from scanning or examining the data unit content of metadata etc. As described above, these processes may be implemented at the gateway, at an end-point agent, at the isolated processing environment, at a management module, at any other component such as an external appliance, or at any combination of these.

Figure 6:
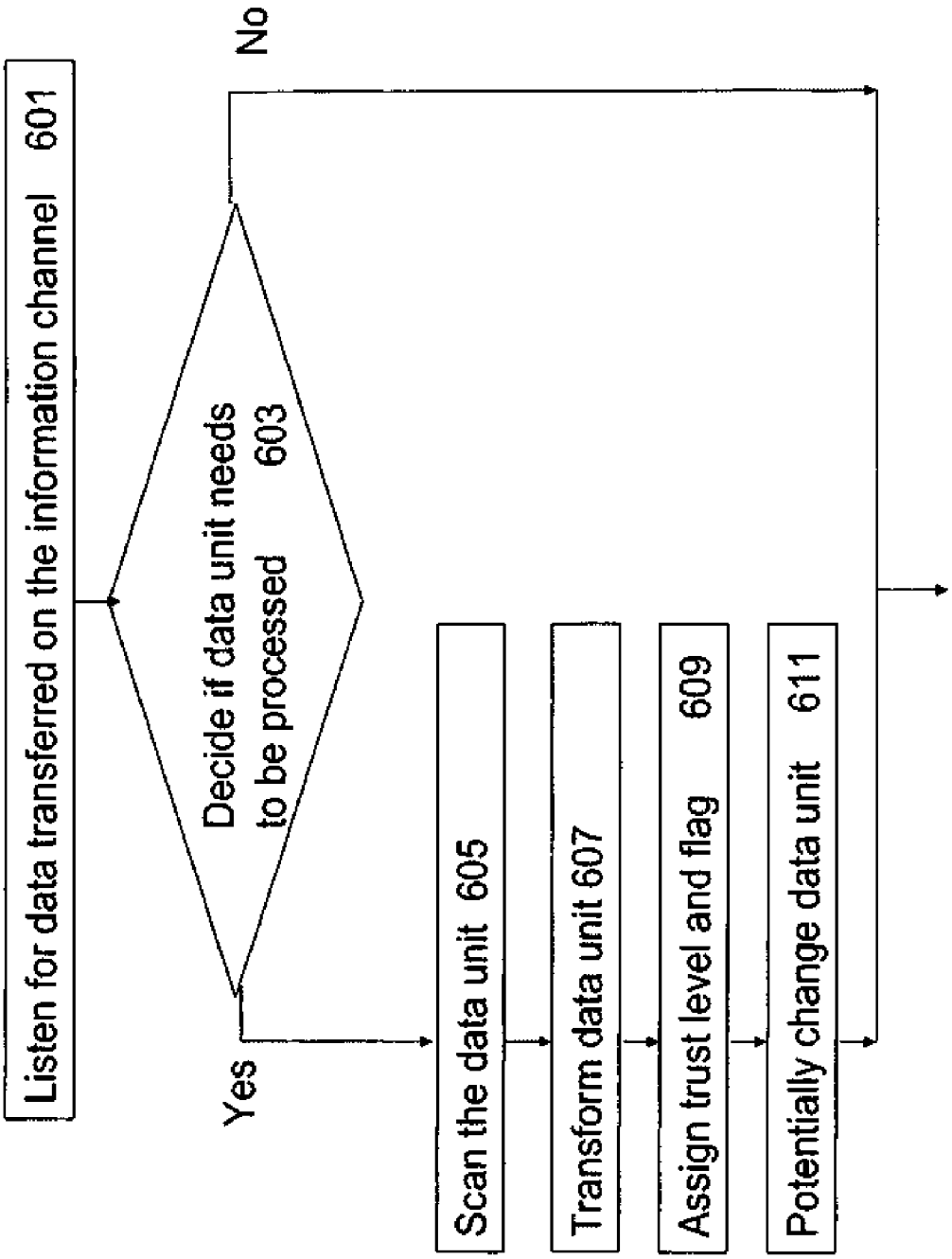
FIG. 6 is a flowchart of a method for protecting against malware according to a second preferred embodiment of the present invention.

FIG. 6 is a flowchart of a possible method for protecting against malware according to a second preferred embodiment of the present invention. This method, which is a variation on the previous method, described above using FIG. 5, comprises: listening for data transferred on information channels 601, and deciding for each data unit if it needs to be processed 603. If the data unit is determined to need to be processed, is preferably scanned 605, and preferably transformed 607. The data unit is then assigned a trust level and flagged according to the assigned trust level 609. Preferably, the data unit is then changed by adding or removing data from the data unit 611.

As described, determining the trust level for a data unit 609 may be done following a complex set of rules, policies, or heuristics. The trust level determination process may be implemented at the gateway, at an end-point agent, at the isolated processing environment, at a management module, at any other component such as an external appliance, or any combination of these.

An example of the above mentioned data unit transformation 607 may include encryption/decryption with a secret key. It is well known in the art that encrypting a data unit results in a pseudo-random sequence of bits that cannot be calculated in advance without knowledge of the secret key used in the encryption process. Thus, an attacker sending malicious content cannot foresee the result of an encryption transformation that is applied on a data unit, without prior knowledge about the secret key used in the encryption process. The transformed data unit cannot be used to attack a computer system, as the attacker has no control over its transformed content. Other types of transformation may include, for example, changing application specific attributes to eliminate the possibility of executing the data unit.

Flagging the data unit 609 may be achieved, for example, by adding information at the head or tail, or anywhere within the data unit. The added information may include data that determines the trust level of the data unit. Another way to flag the data is to create a cryptographic signature of the data unit, or any other representation of the data unit, and pair it with the required additional information about the data unit. The pair may be added to a centralized database, stored in distributed fashion, or in any other way.

Changing the data unit 611 may include deploying a component such as a data inputter, a trust level assigner, an isolated processing environment, a processing environment selector, or an end-point agent to a target computer system, as described below. Such a change may add the necessary data and module that is needed for installation, configuration, and usage of the deployed component. Other changes may include, for example, removing certain types of data from within the processed data-unit.

Preferably the present method is implemented on a gateway component. The present method preferably includes changing the data unit, including removing some of the data from the data unit and storing it on storage servers. A unique identifier or a pointer is then added into the data unit. This pointer or identifier points to the externally stored data. This pointer or identifier is used by the end-point agent when processing the transformed data unit in order to identify the relevant data on the storage server. The relevant data can then be placed on the selected processing environment.

The illustrated method and system may be used to reprocess a data unit at any point in time. Reprocessing a data unit may be scheduled because of a rule, policy, heuristics, or a management module command. Reprocessing may include rescanning the data unit to determine its trust level, retransforming the data unit, flagging the unit with a different trust level and changing the data unit by adding and/or removing data from it. Such reprocessing of the data unit may be implemented at the end-point agent, quarantine server, gateway, or any other component such as an external appliance or any combination of those.

Figure 7:
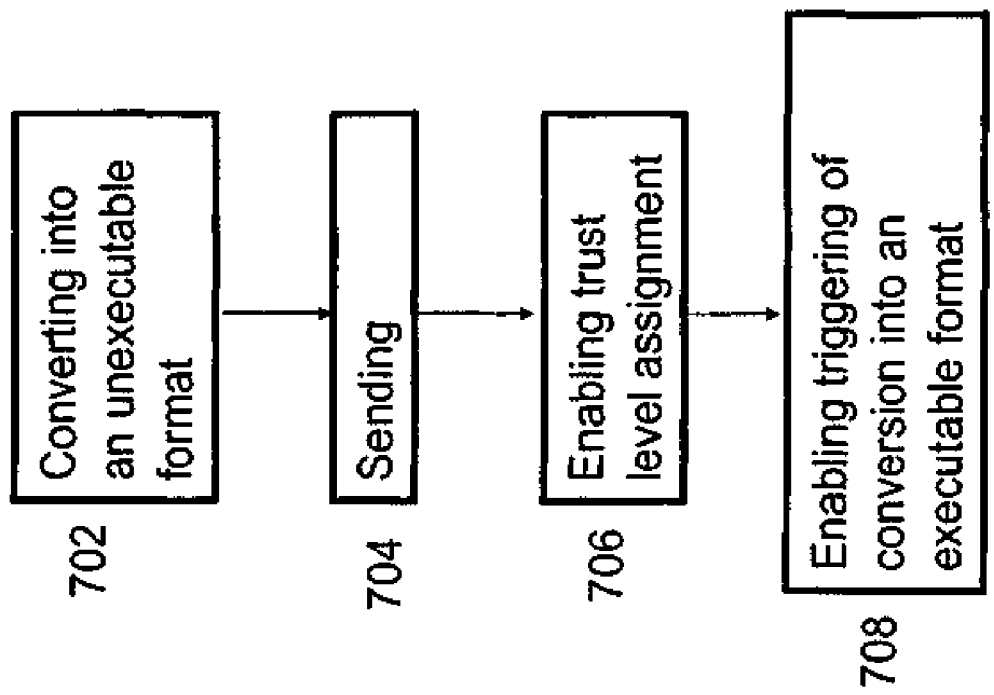
FIG. 7 a flowchart of a method for protecting against malware, according to a third preferred embodiment of the present invention.

FIG. 7 is a flowchart of a possible method for protecting against malware according to another preferred embodiment of the present invention, comprising: converting a data unit into an unexecutable format 702 (for example, by encrypting the data unit) so as to prevent unsecured processing of the data unit, sending the data unit to an end-point system 704, enabling a user on the end-point system to assign the data unit a respective trust level 706, and enabling the user on the end-point system to trigger the conversion of the data unit into an executable format 708, for example by decrypting the data unit, according to the user assigned trust level, as described in greater detail below.

Figure 8:
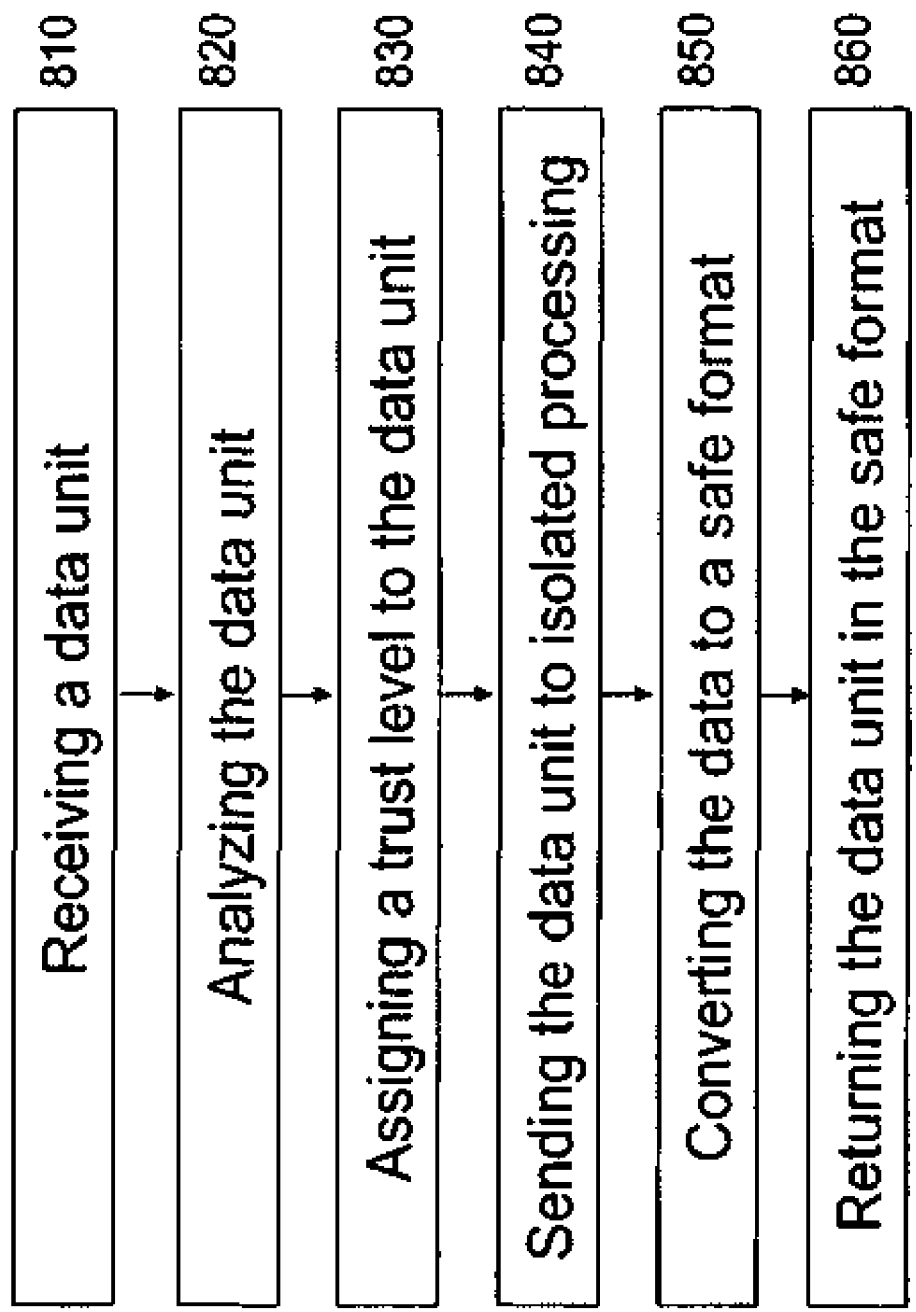
FIG. 8 is a flowchart of a possible method for protecting against malware, according to a fourth preferred embodiment of the present invention.

Reference is now made to FIG. 8 which is a flowchart of a possible method for protecting against malware, according to a fourth preferred embodiment of the present invention. According to a preferred embodiment, data units (for example—textual documents, images, web pages etc.) are received 810.

Each data unit is analyzed 820 and assigned 840 a trust level.

Then, a decision is made 840 whether the data unit is to be sent to an isolated processing environment for processing or not, in accordance with the thrust level assigned to the data unit.

On the isolated processing environment, the sent data unit is converted 850 into a safe format data unit. The safe format unit is believed to be harmful and may be executed out of the isolated processing environment, say on an end-point system, as described hereinabove.

For example, a data unit such as a picture may be sent to the isolated processing environment. On the isolated processing environment, the data unit is converted into a safe format data unit.

The conversion into a safe format data unit may include, but is not limited to: decompressing a compressed image data unit, parsing the style and design of a document data unit, parsing html tags in an html data unit, etc. The safe format data unit may be, but is not limited to an uncompressed raw bitmap, an unformatted textual document (i.e. text without any style, font, or color) or a simple text document (i.e. rich text format with certain restrictions).

Optionally, the safe format data unit may be returned 860 to the end-point system for further processing. For example, a decompressed image safe data unit may be sent to the end-system, pixel by pixel, along with the color of each pixel and the image size.

In addition, a preferred embodiment of the present invention may facilitate compliance with regulatory compliance standards which acknowledge the external malicious risks to internal resources and confidential information and enforce companies to take all the measures to isolate external threats and remove any potential influences on internal resources.

The regulatory compliance standards include, but are not limited to:

1. The Gramm-Leach-Bliley Act—A US law containing provisions that require all financial institutions to disclose to consumers and customers their policies and practices for protecting the privacy of nonpublic personal information. Nonpublic personal information includes any personally identifiable information provided by a customer, resulting from transactions with the financial institution or obtained by a financial institution through providing products or services. The Gramm-Leach-Bliley act is also known as the Financial Modernization Act of 1999.
2. The Health Insurance Portability and Accountability Act. A US regulation that gives patients greater access to their own medical records and more control over how their personally identifiable health information is used. The regulation also addresses the obligations of healthcare providers and health plans to protect health information.
3. The National Association of Securities Dealers (NASD) Rule No. 2711. In order to comply with NASD 2711, financial organizations must identify and protect regulated data wherever it is stored, transmitted or processed, prevent unauthorized data access and usage, ensure that end-users cannot arbitrarily remove protection, and provide evidentiary-quality audit trails that prove data is protected.
4. The Sarbanes-Oxley Act of 2002, also known as the Public Company Accounting Reform and Investor Protection Act of 2002. The Sarbanes-Oxley Act states that all business records, including electronic records and electronic messages, must be saved for not less than five years. The consequences for non-compliance are fines, imprisonment, or both.
5. The Basel Capital Accord (Basel II) imposing compliance standards on the banking industry and the financial sector in general.
6. US Food and Drug Administration Agency (FDA) legislations such as the 21st Code of federal Regulations Part 11 which imposes IT standards on pharmaceutical companies.

EXAMPLE IMPLEMENTATION

Referring now made to FIG. 9, which illustrates an exemplary implementation of a system for protection against malware, according to a preferred embodiment of the present invention, in an enterprise computer network. The following paragraphs describe an exemplary networked environment of an enterprise. Then, the integration of a system and method according to a preferred embodiment of the present invention with the networked environment and its benefits is described.

The example enterprise network architecture comprises several network segments and a connection to external networks 910, including the Internet 915. The communication protocols used in the present embodiment are Ethernet and IP. Standard networking equipment, such as switches, hubs, and routers are used. Some of the network segments are designated for traffic that is completely internal to the enterprise. Other network segments are designated for both internal and external traffic.

Numerous end-point systems 960 are connected to the network segments that are designated for internal only traffic. An email server 950 is connected to the network segments that are designated for both internal and external traffic. It is noted that this is a simplification of the deployment that may be used. Additional deployment details are redundant for the purpose of this specific example.

Firewall 940 is deployed. The deployment of the firewall and the respective firewall policy define three zones: the first zone is connected to the public Internet (called hereafter "the external zone") 910, a second zone is connected to all the network segments that are carrying both internal and external traffic (called hereafter "the buffer zone") 920, and a third zone is connected to all the network segments that are carrying internal enterprise traffic (called hereafter "the internal zone") 930. The firewall policy governs the flow of information between the zones. The firewall policy is configured to deny all requests incoming from the external zone 910 to the internal zone 930. All requests to the buffer zone 920 are allowed or denied per requested service and destination address. In the present example we will assume that only requests for email related services are allowed. It is noted that this is a simplification of the policy that may be used. Additional firewall policy parameters are redundant for the purpose of this example.

The enterprise described in this example has deployed an anti-virus solution. The anti-virus solution is deployed on all end-point systems 960. Furthermore, a specialized version of the anti-virus solution is deployed on the mail server 950. The specialized version scans incoming and outgoing data traffic. Therefore, incoming email traffic is scanned by both the anti-virus deployed on the mail server 950 and by the anti-virus deployed on the end-point systems 960. The enterprise in the example updates the anti-virus signatures as soon as new signature banks are made available.

An IDS/IPS solution is also deployed on the exemplary enterprise network. The IDS/IPS solution is based on both signature banks and heuristic methods. The signature banks of the IDP/IPS solution are updated as soon as new signature banks are made available.

The standard equipment is used for the servers and end-point systems 960 in the computer network. The email server 950 is a standard server-class PC running a Microsoft Inc.® Windows operating system and a Microsoft Inc.® Exchange Server Software, serving as the organizational email server. End point clients 960 are workstation-class PCs, running Microsoft® Windows operating systems and using Microsoft® Outlook as an email client. The email client is used by employees to manage their email activities, such as receiving and reading incoming mail and sending email messages.

One of the businesses critical information channels the enterprise uses is email. The enterprise uses emails extensively to communicate with partners and customers outside the organization as well as between colleagues within the organization. An email message may include the message text, the message attributes —such as a subject line and a recipients list—and possibly one or more attached files ("attachments"). Each email message can be sent to a number of addresses, some of these addresses may reside within the organization while the others may reside out of the organization. Employees use an email client on their end-point systems 960 (for example, Microsoft Outlook) to send and receive emails. All emails, both emails sent to addresses that are internal to the enterprise and emails sent to addresses that are external to the enterprise, are presented by the same email client The following sections describe an example of email message flow within the organization and analyze the associated malware threats. Note that the message flow described here does not yet include the deployment of a malware protection system according to a preferred embodiment of the present invention. Therefore this illustrative flow serves only as an example of the email flow before such a system is incorporated into the enterprise network.

An email is sent to an employee of the example enterprise. The email message arrives at the mail server 950 of the enterprise described. The anti-virus solution installed at the end-point system 960 then scans the email message as it arrives. The email server 950 stores the message until an email client, running on an end-point system 960, requests it.

Once the email client installed at the end-point system 960 requests the email, the email client communicates with the email server 950 and fetches the email message from the server to the client. The client then processes and displays the email message. If the employee chooses to reply to the message, the email client program allows the employee to edit a response and send it to target email addresses. The email client then transfers the reply email message to the email server 950. The anti-virus deployed at the email server 950 scans the reply email. The email server then sends the reply email message to all the necessary email servers as specified by the email target addresses.

It is possible that the email sent to the employee at the enterprise contained malware. As described earlier in the document, traditional solutions such as anti-viruses are based on signature banks of known threats and heuristic methods. Because of recent trends described earlier, it is likely that the malware contained within the email message is currently not included in the IDP/IPS and anti-virus signature banks. It is also likely that the attributes of the malware and its operation are similar to essential business data. Consequently, this malware is undetectable by heuristic methods. In such a case, the malware arrives at the end-point system 960 without any intervention of the traditional security mechanisms (Firewall, Anti-viruses and IDS/IPS) deployed by the example enterprise. The malware then executes its malicious payload at the end-point system 960, at the very heart of the computer network used by the enterprise.

The following paragraphs describe how a system, designed according to a preferred embodiment of the present invention, as illustrated in FIG. 9, is integrated into the exemplary enterprise network environment and email system.

The email server 950 is identified as a place where data from different sources is intermixed. The email server receives emails from outside the enterprise, stores them and allows end-point systems 960 within the enterprise to fetch them. Email messages sent from within the enterprise to peers outside the enterprise also pass through the email sever. A gateway component 952 which includes a data inputter and a trust level assigner is deployed at the email server. The gateway component analyzes and processes each incoming and outgoing email message as a data unit. On the gateway component 952, the email messages are intercepted by the data inputter, and assigned a respective trust level according to a policy defined by the example enterprise, using the trust level assigner.

If required by the policy, the gateway component 952 transforms the email messages using a data modifier installed thereon. As described above, in a preferred system embodiment according the present invention, the data modifier utilizes encryption/decryption with a secret key such as DES. The secret key is determined by the enterprise, and is unknown outside the enterprise. If required by the policy, flagging the data is also implemented by adding a header to the transformed email message with the required information. The header information includes the trust level of the email message and the end-point agent installation module.

An installation module is executed automatically on the end-point system 960 as soon as it is processed by the end-point system 960 email client, using techniques that are known in the art. The installation module determines if the end-point agent 961 and gateway component 962 are installed on the end-points system 960. If it is not installed, the installation module automatically installs an end-point agent 961 and a gateway component 962.

The end-point agent 961 integrates with the email client on the end-point system 960, and adds the required malware protection functionality. When an email message is processed by the email client, the end-point agent 961 preempts normal processing and checks the trust level assigned to the email message. If the email message is flagged as untrusted, the end-point agent 961 utilizes a processing environment selector, to select the processing environment for this email message to be a quarantine server 975, in the isolated-processing environment 970. In any other situation, the processing environment is the local computer system (end-point system 960) and processing proceeds without further intervention from the end-point agent 961.

If the processing environment was determined to be an isolated processing environment 970, the end-point agent 961 changes the normal behavior of the email client to perform the following stages. First, the end-point agent 961 sends the email message to be processed at a quarantine server 975, in the isolated-processing environment 970. During the period the email message is processed on a quarantine server 975, the end-point agent 961 communicates with the isolated-processing environment 970. The communication transfers all information required by a user to control and operate the email processing on the quarantine server 975. This information typically includes: bitmaps of screen images and updates of the email editing window that are transferred from the isolated-processing environment 970 to the end-point system 960, keyboard and mouse input that are transferred from the end-point system 960 to the isolated-processing environment 970, sound streams, video streams and any other information required for viewing and controlling the email editing process. Email addresses and other information that may be required by the email editing window that is stored on the end-point system 960 is also transferred to the quarantine server 975, in the isolated-processing environment 970.

When isolated processing of the email message is completed by the quarantine server 975, in the isolated-processing environment 970, the processed email data is transferred back from the isolated-processing environment 970 to the end-point system 960. All state information that is needed to allow future processing of the email message is transferred. This information includes: the email message body, message attributes, and all attachments. Furthermore, all settings changes for the email editor and other relevant programs are also transferred to the end-point system 960. The end-point agent 961 then stores the processed email message and the relevant information locally at the end-point system 960. Information is stored in a similar way to email messages that were processed locally, e.g. if the processed message is sent, it is stored in the "sent items" folder of the email client, if the processed message is stored as a draft, it is stored in the "drafts" folder of the email client.

The communication between the end-point system 960 and the isolated-processing environment 970, is a process where data from different sources is intermixed. A quarantine server 975 processes information that is flagged as untrusted and that originated from a different source than the information processed by the end-point system 960. Therefore, a gateway component 962 is deployed for the communication channel, on the end-point system 960.

The gateway component 962 is installed by the end-point agent installation module on the end-point system 960. This gateway component 962 analyzes and processes the communication between the end-point agent 961, residing on the end-point system 960 and the isolated-processing environment 970. The gateway component 962 scans the information transferred, using a data scanner/module. The policy of the gateway component 962 dictates that if the gateway component 962 detects that an email message flagged as untrusted is transferred from the end-point system 960 to the isolated-processing environment 970, it reverses the transformation that was done at the gateway component 952 deployed at the email server 950 and removes the header information added to the message. The policy further dictates that if the gateway components detects that an email message is transferred back from the isolated-processing environment 970 to the end-point system 960, it transforms this message using the same transformation functionality as the gateway component 952 deployed on the email server uses and will add the header information as added by the gateway component 952 deployed on the email server.

Some communications between the isolated-processing environment 970 and the end-point system 960, such as clipboard operations (copy, cut, paste etc) and configuration information, may be assigned a trust level. The gateway component 962 deployed at the end-point system 960 scans, as noted, the communications and, if the enterprise policy specifies, removes those data units from the communication exchange.

In order to integrate the exemplary malware protection system into the network environment, the enterprise should install the quarantine server(s) 970. Adding the quarantine server(s) into the enterprise is done by creating a new network segment designated for the quarantine server(s) 970. This network segment carries only quarantine server(s) 970 communications with the end-point agents 962. The new network segment is connected to the firewall 940 and the firewall policy is updated to include it. The network segment is defined as a new zone, called "the isolated-processing environment zone". A rule is added to the firewall policy specifying that only requests originating from the internal zone 930 are allowed into the isolated-processing environment 970. All requests to establish a connection incoming from the isolated-processing environment 970 to any other zone are denied. In the present example the enterprise deploys only one quarantine server 975 in the isolated-processing environment 970. This server serves as a quarantine server for all the end-point systems.

In the present example, the quarantine server 975 is a regular server-class PC. The server runs a Windows operating system and is installed with all software that is required to support the email operations. This software includes the email client (Microsoft Outlook) and supporting applications that are required in order to view and edit email attachments, such as Microsoft Office applications.

In addition, the isolated processing environment 970 establishes a communication channel with the end-point system 960. This communication channel is utilized to transfer all the required information used to control the processing on the quarantine server 975, and all other data communications with the end-point system 960, as described above. The quarantine server 975 receives the communications from the end-point agents 961, processes the necessary email messages via the email client installed on the quarantine server 975, and communicates required information back to the end-point agent 961. The information preferably includes bitmaps of screen images and updates of the email editing window transferred from the quarantine server 975 to the end-point system 961, keyboard and mouse input transferred from the end-point system 961 to the quarantine server 975, sound streams, video streams and any other information required for viewing and controlling the email editing process. When the processing is done, the quarantine server 975 communicates back to the end-point agent 961 all state information required (such as the processed email message and all configuration related information).

A management module 980 is installed to control the operation of the exemplary malware protection system within the enterprise. The management module 980 allows the enterprise to define its policies and control data unit trust level assignment on all end-point systems 960.

The enterprise policy in the present example is to flag every email message originating from outside the organization as untrusted, therefore the policy configured at the gateway component 952, which is deployed at the email server 950, and implemented thereon using a data inputter, a trust level assigner, and a processing environment selector, is to scan for incoming emails that originated from outside the organization and process them. The policy for outgoing emails states that outgoing emails, that are targeted for outside the enterprise and are flagged as untrusted, are processed with the reverse transformation to the transformation that is applied to incoming emails and are stripped from the header added by the gateway 952. The enterprise also defines its policy to never allow a "paste" clipboard operation from an untrusted content to trusted content. This requirement dictates that the gateway component 962 deployed at the end-point systems denies all incoming "paste" information that is communicated from the quarantine server(s) 975 to the end-point system 960.

The following sections describe an example email message flow within the organization after a malware protection system according to a preferred embodiment of the present invention is deployed.

An email is sent to an employee of the enterprise. When an email message is sent, it arrives at the email server of the enterprise described in this example (a Microsoft Exchange Server) 950. The anti-virus software deployed on the email server scans the incoming mail. After this process, the gateway component 952 installed at the email server, utilizes a data inputter to intercept the email message and determines that the incoming email message originated from outside the enterprise. According to the policy defined, this email message is then transformed, using a data modifier, and a header that states "this email message is untrusted" is included. Additionally, an installation module is added to the email message. The email server 950 stores the message until an email client, running on an end-point system 960, requests it.

When the email client installed at the end-point system 960 requests the mail, it communicates with the email server 950 and the email message is fetched from the server to the client. The anti-virus solution installed at the end-point system 960 then scans the email message as it arrives. The installation module then executes, and installs the end-point agent 961 and gateway component 962 on the client system. The client then attempts to process and display the email message.

The end-point agent 961 preempts the processing and check the trust level assigned to this email message. Since this email message was processed by the gateway component 952 deployed at the email server, it is flagged as untrusted. The processing environment that is chosen for this email using the processing environment selector is a quarantine server 975. The email is sent to the quarantine server 975 for processing. Then, a communication channel session is opened. During this communication session, the gateway component 962 deployed at the end-point system 960 (installed by the end-point agent installation module) analyzes and processes the email message communications, reversing the transformation done at the gateway component 952 deployed at the email server 950, and removing the added header.

When the email arrives at the quarantine server 975 in the isolated processing environment 970, it is processed by the email client program. The isolated processing environment 970 then communicates to the end-point agent 961 all necessary information (such as bitmaps of screen images and updates of the email editing window, sound streams, video streams) for viewing and controlling the email editing process. This information is scanned by the gateway component 962 deployed at the end-point system 960. In case a "paste" data unit is identified, it is removed from the communications by the gateway component, using a data modifier.

The end point agent 961 then displays the information received from the isolated processing environment 970 on the screen of the end-point system 960 and allows the employee to control the email editing window by using the keyboard and mouse. Every operation the user performs on the end-point system 960 that is relevant to the email editing session (such as a mouse movement or typing on the keyboard) is transferred by the end-point agent 961 to the quarantine server 975 in the isolated processing environment 970 and is performed on the quarantine server 975. This process allows the employee to interactively control the email message editing process executed on the quarantine server 975 from the end-point system 960.

The process is seamless from the perspective of the user—it follows the same lines as email message editing before the exemplary system was incorporated into the enterprise. The user continues to work within his computing environment, on his end-point system. The only difference is that the local email editing window is replaced by a bitmap image of the editing window on the quarantine server 975.

If the employee chooses to reply to the message, the email client program allows the employee to edit a response and send it to target email addresses. Note that the email client that processes the mail is executed on the quarantine server 975, in the isolated processing environment 970. This email client is controlled by the employee from the end-point system 960 through the communication channel. As described above, such functionality is made available by exchanging information such as bitmaps of screen images, updates of the email editing window, sound streams and video streams (transferred from the isolated processing environment 970 to the end-point system 960), keyboard and mouse input (transferred from the end-point system 960 to isolated processing environment 970), and any other information required for viewing and controlling the email editing process. For example, in order to allow the employee to choose the email addresses she would like to target her reply to, her email address book information is transferred from the end-point system 960 to the quarantine server 975 in the isolated processing environment 970.

The reply processing ends when the employee instructs the email client program to send the reply. At this point, processed email data is transferred back to the end point system 960. This information includes: the email message body, message attributes, and all attachments. Furthermore, all settings changes for the email editor and other relevant programs are also transferred to the end-point system 960.

The information sent from the isolated processing environment 970 to the end point system 960 is scanned by the gateway component 962 deployed at the end-point system 960. This gateway component identifies that an email message is sent back from the quarantine server 975 in the isolated processing environment 970. According to the specified policy, the gateway 962 transforms this message using the same transformation as the gateway component 952 deployed on the email server uses and adds the header information as added by the gateway component deployed on the email server. The end-point agent 961 then receives this email message, and processes it in a similar way to a sent email message that was edited locally. The email message (transformed and flagged as untrusted by the gateway component) is saved in the "sent items" folder, and sent to the email server 950 for further processing.

In addition to the email message, the isolated processing environment 970 may send additional information, such as configuration information, back to the end-point system 960. The end-point agent 961 stores this information and uses this information locally. Note that it is possible to configure a policy that denies all or a subset of the configuration information at the gateway component 962 deployed at the end-point system 960.

When the sent email arrives at the email server 950, the gateway component deployed at the email server 952 scans the outgoing email message. As defined in the policy, all outgoing email messages that are targeted for recipients outside the enterprise and are flagged as untrusted, are processed with the reverse transformation to the transformation that is applied for incoming emails and are stripped from the header added by the gateway. In the context of the reply message sent by the employee, this means that all target email addresses that are outside the enterprise receive a non-transformed version with no header, while target email addresses within the enterprise receive a version that is transformed and flagged as untrusted. As before, the anti-virus deployed at the email server 950 scans the reply email. The email server 950 then sends the reply email message to all the necessary email servers as specified by the email target addresses.

Note that as soon as the email editing session is completed on the quarantine server 975 (as soon as the email is sent), and all state information is sent to the end point system 960, the quarantine server 975 stops storing any essential business data. Therefore, it is possible to reset, or reinstall the quarantine server 975 to a predetermined image at this point in time without loosing any information that is essential to the enterprise.

It is possible that the example enterprise chooses to reclassify its untrusted data each time a new signature bank update is available. Each signature bank update contains signatures that are known at the time the signature update was created. Once all end-point systems 960, email server 950, and IDS/IPS systems are updated with the new signature, the enterprise may choose to reclassify all untrusted data received before the date the signature bank was created as trusted. The reclassification allows the enterprise to scan this data with an appropriately updated version of the signature bank. However, this may also expose the enterprise to malware threats that are not covered by the signature bank, but were available in this timeframe. Therefore, the decision whether to follow this practice is up to the enterprise policy, and changes according to the enterprise current threats analysis.

The described example implementation of a system and method according to a preferred embodiment of the present invention and its integration with the email system of the example enterprise allows the enterprise to flag untrusted email messages and process them while maintaining full functionality and avoiding malware threats associated with those emails. The example implementation shows how the above described system and method change dramatically the email threat analysis by removing possible attacks on the end-point systems. The above described embodiment presents an apparatus, system and method according to a preferred embodiment of the present invention which protects against various malware threats without the use of signatures or heuristics, while existing end points software, servers, and security solutions are utilized.

It is expected that during the life of this patent many relevant computing devices and systems will be developed and the scope of the terms herein, particularly of the terms "Gateway", "Server", "Firewall", "Anti-virus", "IDS/IPS", and "Processing environment", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for protecting against computer malicious software (malware), comprising:
  a data inputter for intercepting all data that flows to at least one target, wherein said data comprises at least one data unit;
  a trust level assigner, associated with said data inputter, for assigning to each of said data units a respective trust level based on at least one from a set, the set comprising: the content of each data unit, metadata associated with each data unit, analysis results from scanning the data unit content of metadata, and analysis results from examining the data unit content of metadata;
  an isolated-processing environment, operable to process said data units in an isolated manner and configured to send copies of the processed data units out of said isolated-processing environment to said target; and
  a processing environment selector, associated with said trust level assigner and said isolated-processing environment, operable to determine if a data unit is to be executed on said isolated-processing environment, in accordance with said respective trust level.

2. The apparatus of claim 1, wherein said data units are e-mail messages.

3. The apparatus of claim 1, wherein said data units are files.

4. The apparatus of claim 1, farther comprising an end-point agent residing on an end-point computer system, and associated with said isolated processing environment, said end-point agent being for controlling the processing of data units.

5. The apparatus of claim 4, wherein each of said data units is stored with the respective trust level.

6. The apparatus of claim 4, wherein the end-point agent is configured to visually mark said data units, to allow distinguishing said data units from other data units.

7. The apparatus of claim 1, wherein said isolated-processing environment is periodically restored to a known state.

8. The apparatus of claim 1, further comprising a management module, operable to configure components of said apparatus.

9. The apparatus of claim 1, further comprising a data modifier for modifying said data units, according to the respective trust level.

10. The apparatus of claim 9, wherein said modifying includes removing a subset of data from said data unit.

11. The apparatus of claim 9, wherein said modifying comprises one from a set, the set comprising encryption of at least a part of said data unit, and decryption of at least a part of said data unit.

12. The apparatus of claim 4, further comprising an installation module for installing, on a networked computer, at least one of: data inputter, trust level assigner, isolated processing environment, processing environment selector, and end-point agent.

13. The apparatus of claim 4, wherein said end-point agent is operable to provide said isolated-processing environment with information for controlling the processing of said data units on said isolated-processing environment.

14. The apparatus of claim 13, wherein said information includes keyboard operations, performed at said end-point system.

15. The apparatus of claim 13, wherein said information includes mouse operations, performed at said end-point system.

16. The apparatus of claim 13, wherein said end-point agent is further configured to filter said information.

17. The apparatus of claim 4, wherein said isolated-processing environment is operable to provide said end-point agent with information for monitoring said data units processing on said isolated-processing environment.

18. The apparatus of claim 17, wherein said end-point agent is further configured to filter said information.

19. The apparatus of claim 17, wherein said end-point agent is further configured to modify said information.

20. The apparatus of claim 17, wherein said information includes clipboard operation data.

21. The apparatus of claim 17, wherein said information includes drag and drop data.

22. The apparatus of claim 17, wherein said information includes visual data.

23. The apparatus of claim 22, wherein said visual data is video data.

24. The apparatus of claim 4, further comprising a display unification agent, residing on the end-point system, and configured for creating replica windows for at least one display window originating from the isolated-processing environment.

25. The apparatus of claim 24, wherein said replica windows are marked using a differentiating visual effect.

26. The apparatus of claim 25, wherein said differentiating visual effect is a distinctly colored border around at least one of said replica-windows.

27. The apparatus of claim 25, wherein said differentiating visual effect is a red colored border around at least one of said replica-windows.

28. The apparatus of claim 17, wherein said information includes audio data.

29. The apparatus of claim 1, wherein said isolated-processing environment comprises at least one quarantine server.

30. The apparatus of claim 29, wherein at least one quarantine server is implemented as a logical entity.

31. The apparatus of claim 30, wherein said logical entity is confined to an isolated space on a non-isolated computer system.

32. The apparatus of claim 1, wherein said isolated processing environment is further configured to convert said data unit determined to be executed on said isolated processing environment into a safe format data unit, said safe format data unit being executable out of said isolated processing environment.

33. The apparatus of claim 32, wherein said safe format is a bitmap representation of the data.

34. The apparatus of claim 33, wherein said bitmap representation consists of size and color of each pixel of the image.

35. The apparatus of claim 32, wherein said safe format is an unformatted plain text representation of the data.

36. The apparatus of claim 1, wherein said isolated processing environment is automatically restored to a predefined state upon a predefined condition.

37. The apparatus of claim 1, wherein said isolated processing environment is further configured to limit storage of each of said data units on the isolated processing environment to a respective duration of processing of said data unit on said isolated-processing environment.

38. System for protecting against computer malware, components comprising:
   a data inputter for intercepting all data that flows to at least one target, wherein said data comprises at least one data unit;
   a trust level assigner, associated with said data inputter, for assigning each of said data units a respective trust level based on at least one from a set, the set comprising: the content of each data unit, metadata associated with each data unit, analysis results from scanning the data unit content of metadata, and analysis results from examining the data unit content of metadata;
   an isolated-processing environment, operable to process said data units in an isolated manner and configured to send copies of the processed data units out of said isolated-processing environment to said target;
   at least one end-point system for processing said data units, in a non-solated manner;
   at least one end-point agent, each residing on a respective end point system, and associated with said isolated processing environment, and operable to provide said isolated-processing environment with information for controlling the processing of said data units on said isolated-processing environment; and
   a processing environment selector, associated with said trust level assigner, with said isolated-processing environment, and with said end-point system, and operable to select between said isolated-processing environment and said end-point system for data unit execution, in accordance with said respective trust level.

39. The system of claim 38, further comprising a management module, for configuring said system for protecting against computer malware.

40. The system of claim 38, further comprising a data modifier for modifying said data units.

41. The system of claim 38, wherein said data inputter resides on a gateway.

42. The system of claim 38, wherein said data inputter resides on said end-point system.

43. The system of claim 38, wherein said data inputter is one of a group comprising: a mail server, a web server, a file server, a removable media device reader.

44. The system of claim 38, wherein said isolated processing environment is further configured to limit storage of each of said data units on the isolated processing environment to a respective duration of processing of said data unit on said isolated-processing environment.

45. Method for protecting against computer malware, comprising:
   receiving all data transferred to at least one target, wherein said data comprises at least one data unit;
   analyzing said data units;
   assigning to each of said data units a respective trust level, based on at least one from a set, the set comprising: the content of each data unit, metadata associated with each data unit, analysis results from scanning the data unit content of metadata, and analysis results from examining the data unit content of metadata;
   determining for each of said data units if it should be executed in an isolated manner, in accordance with said assigned respective trust level;
   processing data units determined to be executed in an isolated manner on said isolated-processing environment, wherein said isolated processing environment is further configured to convert said data unit determined to be executed on said isolated processing environment into a safe format data unit, said safe format data unit being executable out of said isolated processing environment; and sending copies of the processed data units out of said isolated-processing environment to said target.

46. The method of claim 45, further comprising setting and implementing rules for at least one of said assigning and said determining.

47. The method of claim 45, further comprising providing said isolated-processing environment with information for controlling data unit processing.

48. The method of claim 45, further comprising obtaining information for monitoring said data unit processing by said isolated-processing environment.

49. The method of claim 48, wherein said information includes video and audio data.

50. The method of claim 45 wherein said isolated-processing environment comprises at least one quarantine server.

51. The method of claim 45 further comprising modifying said data units.

52. The method of claim 51 wherein said modifying includes flagging said data unit in accordance with their respective trust levels.

53. The method of claim 51, wherein said modifying includes removing data from said data unit.

54. The method of claim 51, wherein said modifying includes adding data to said data unit.

55. Method for protecting against computer malware, comprising:
converting, by an isolated processing unit, a data unit comprising data in an executable format into an unexecutable format;
sending, by the isolated processing unit, said data unit to an end-point system;
enabling a user on said end-point system to assign said data unit a respective trust level, wherein a trust level corresponds to a likelihood that the corresponding data unit comprises malware; and
enabling the user on said end-point system to trigger conversion of said data unit into an executable format, when the assigned trust level is indicative of the user wishing to execute the data unit.

56. Method for protecting against computer malware, comprising:
converting, by an isolated processing unit, a data unit comprising data in an executable format into an unexecutable format;
sending, by the isolated processing unit, said data unit to an end-point system;
enabling a user on said end-point system to assign said data unit a respective trust level, assigning said data unit a respected trust level, wherein a trust level corresponds to the user's perceived likelihood that the corresponding data unit comprises malware; and
converting said data unit into executable format when the assigned trust level is indicative of the user wishing to execute the data unit.

* * * * *

UNITED STATES PATENT AND TRADEMARK OFFICE
CERTIFICATE OF CORRECTION

| | | |
|---|---|---|
| PATENT NO. | : 7,490,353 B2 | |
| APPLICATION NO. | : 11/357947 | |
| DATED | : February 10, 2009 | |
| INVENTOR(S) | : Ron Kohavi | |

It is certified that error appears in the above-identified patent and that said Letters Patent is hereby corrected as shown below:

In column 22, line 34, in Claim 4, delete "farther" and insert -- further --, therefor.

In column 24, line 18, in Claim 38, delete "non-solated" and insert -- non-isolated --, therefor.

Signed and Sealed this
Twelfth Day of July, 2011

David J. Kappos
*Director of the United States Patent and Trademark Office*